UNITED STATES PATENT OFFICE.

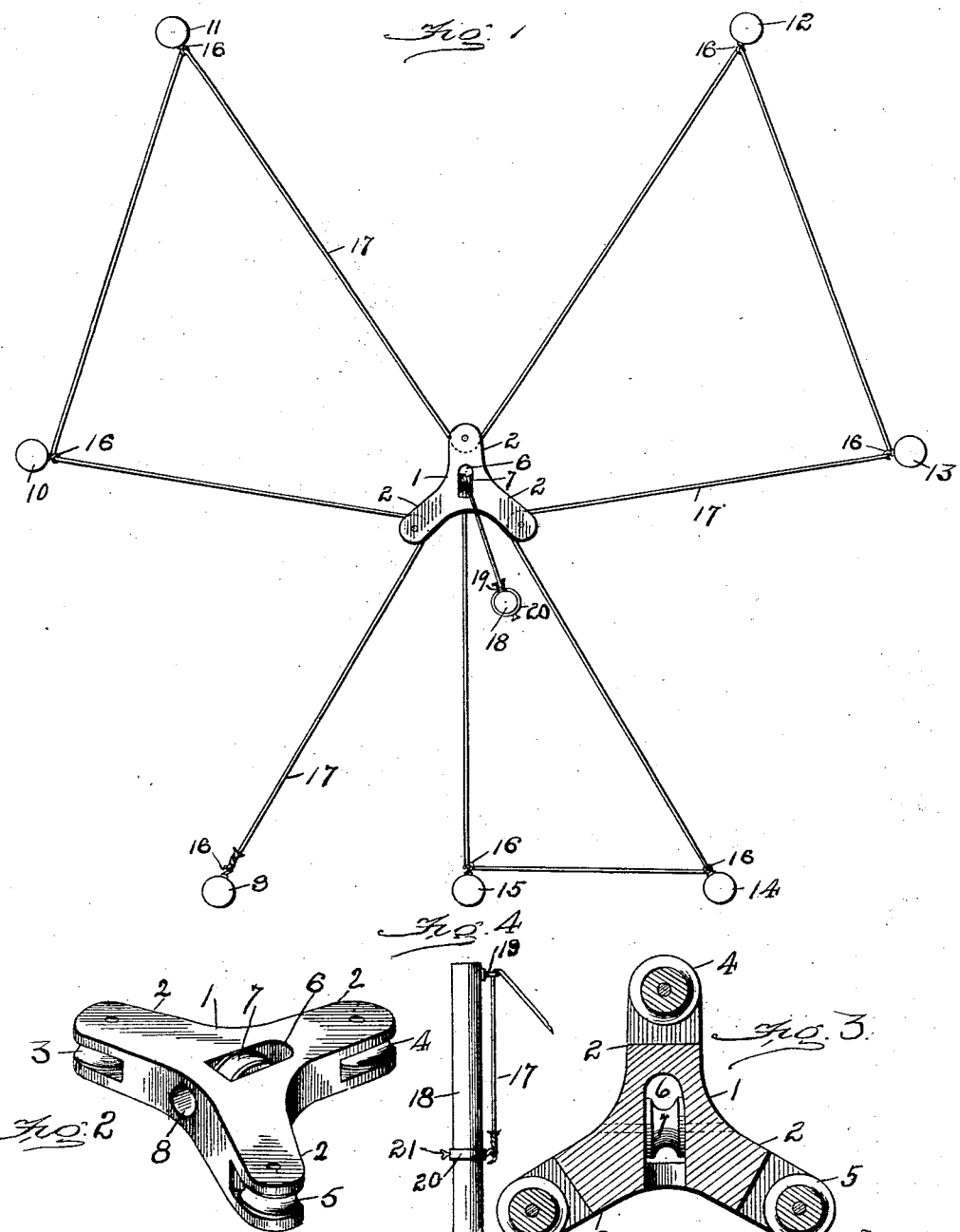

GEORGE B. HEAD, OF PREACHER, VIRGINIA.

CLOTHES-LINE APPARATUS.

SPECIFICATION forming part of Letters Patent No. 684,235, dated October 8, 1901.

Application filed July 15, 1901. Serial No. 68,395. (No model.)

*To all whom it may concern:*

Be it known that I, GEORGE B. HEAD, a citizen of the United States, residing at Preacher, in the county of Wise and State of Virginia, have invented certain new and useful Improvements in Clothes-Line Apparatus, of which the following is a specification, reference being had therein to the accompanying drawings.

My invention relates to new and useful improvements in clothes-drying apparatus; and it is more especially an improvement upon the device described and claimed in Patent No. 671,422, granted to J. T. McLean on April 2, 1901.

The primary object of the invention is to provide a simple and inexpensive device in connection with a line of considerable length, whereby said line may be tightened at several points between its ends and prevented from sagging.

A further object is to so construct the device that the line will be tightened when under pressure which would tend to sag the same.

With these and other objects in view the invention consists in the novel construction and combination of parts hereinafter more fully described and claimed, and illustrated in the accompanying drawings, showing the preferred form of my invention, and in which—

Figure 1 is a plan view of the complete apparatus. Fig. 2 is a perspective view of the central line-holder. Fig. 3 is a horizontal section therethrough; and Fig. 4 is an elevation of the central supporting-pole, with the line in position thereon and inclined downward to the central line-holder, not shown.

1 is the body of the central line-holder, having three similar arms 2 extending therefrom at equal distances from each other. Within the ends of these arms are journaled horizontally-revoluble pulleys 3, 4, and 5, respectively. A vertical passage 6 extends through the center of the body 1, as shown, and journaled therein is a vertically-revoluble pulley 7. A horizontal passage 8 runs through one side of the body and opens into the passage 6 on a line with the center of pulley 7. Poles numbered from 9 to 15, respectively, are suitably arranged, and each is provided with a hook or ring 16 at its upper end. One end of a line 17 is secured to the hook of pole 9, and the line is then passed over pulley 3, through the rings of poles 10 and 11, over the pulley 4, through the rings of poles 12 and 13, over the pulley 5, and thence through the rings of the remaining poles 14 and 15. The line is then brought into the central line-holder 1 via the horizontal passage 8 and is passed under the pulley 7 and up through passage 6. A pole 18 is located in close proximity to the line-holder and is provided at its upper end with a ring 19. The line 17 is passed down through this ring and is secured to a sleeve 20, slidably mounted upon the pole. A set-screw, as 21, is provided, whereby the sleeve may be locked in adjusted position upon the pole 18. After the line has been placed in position, as above described, the sleeve 20 is drawn down until the entire line is taut. Said ring is then locked in position and the line is ready for use. As the ring 19 of pole 18 is above the line-holder 1, that portion of the line 17 extending from the pulley 7 to the ring 19 will serve as a support for the holder. When clothes or other articles are placed upon the line, any sagging of the holder 1 will lengthen that portion of the line lying between pulley 7 and ring 19 and the entire line will be tightened in proportion.

In the foregoing description I have described the preferred form of my invention; but I do not limit myself thereto, as I am aware that modifications may be made therein, and I therefore reserve the right to make such changes as fairly fall within the scope of my invention.

Having thus fully described my invention, what I therefore claim as new, and desire to secure by Letters Patent, is—

1. In a clothes-drying apparatus, a central line-holder comprising a body, arms projecting therefrom, a horizontal pulley journaled in each arm and a vertical pulley journaled in a passage in the center of the body, said passage communicating with a second passage through the side of the body.

2. A clothes-line apparatus comprising a central line-holder having a body, arms extending therefrom, pulleys journaled in the arms, a pulley journaled in a passage extending vertically through the body, poles, a line engaging the poles and passing over the pulleys of the arms and under, and upward from, the pulley in the body, and a pole, adjacent to the line-holder, to which the said line is secured.

3. The combination with a series of poles; of a central line-holder comprising a body having a pulley journaled in a vertical passage therethrough, said passage communicating with a second or horizontal passage through one side of the body, arms extending from the body, pulleys journaled therein, a line secured at one end to one of the poles and slidably connected to the remaining poles, said line passing over the pulleys in the arms, through the passages in the body, and under, upward and over, the pulley in the body, a pole adjacent to the line-holder, a ring thereon and above the holder and adapted to receive the line, a sleeve slidably mounted on said pole and secured to the line, and means for locking the sleeve in position upon the pole.

In testimony whereof I affix my signature in presence of two witnesses.

GEORGE B. HEAD.

Witnesses:
 HENDERSON HEAD,
 C. C. HEAD.